US012744019B1

(12) United States Patent
Shintani et al.

(10) Patent No.: US 12,744,019 B1

(45) Date of Patent: Sep. 22, 2026

(54) AMBIENT LIGHT CONTROL FOR DISPLAYING CONTENT

(71) Applicant: Sony Group Corporation, Tokyo (JP)

(72) Inventors: Peter Shintani, San Diego, CA (US); Yuta Mizobata, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/188,651

(22) Filed: Apr. 24, 2025

(51) Int. Cl.
*G09G 5/10* (2006.01)

(52) U.S. Cl.
CPC ....... *G09G 5/10* (2013.01); *G09G 2320/0233* (2013.01); *G09G 2320/066* (2013.01); *G09G 2320/0666* (2013.01); *G09G 2354/00* (2013.01); *G09G 2360/144* (2013.01)

(58) Field of Classification Search
CPC ............. G09G 5/10; G09G 2320/0233; G09G 2320/066; G09G 2320/0666; G09G 2354/00; G09G 2360/144
See application file for complete search history.

(56) References Cited

U.S. PATENT DOCUMENTS

| | | | | |
|---|---|---|---|---|
| 9,967,529 | B2 | 5/2018 | Mitchell et al. | |
| 11,605,362 | B2 * | 3/2023 | Matsumoto | G09G 5/10 |
| 12,100,334 | B1 * | 9/2024 | Oh | G02F 1/0063 |
| 12,176,331 | B2 * | 12/2024 | Plank | H04M 1/0266 |
| 12,242,070 | B2 * | 3/2025 | Grundhoefer | G02B 27/0172 |
| 2009/0010537 | A1 * | 1/2009 | Horie | G09G 5/02 348/222.1 |
| 2010/0066712 | A1 * | 3/2010 | Tomonaga | H04N 5/202 345/207 |
| 2011/0175925 | A1 * | 7/2011 | Kane | G01J 1/4204 345/589 |
| 2012/0182275 | A1 * | 7/2012 | Chen | G09G 5/10 345/207 |
| 2020/0380938 | A1 * | 12/2020 | Greenebaum | G09G 5/06 |
| 2024/0105131 | A1 * | 3/2024 | Tann | G09G 3/346 |
| 2024/0161706 | A1 * | 5/2024 | Wanat | G09G 3/001 |

FOREIGN PATENT DOCUMENTS

| | | | | |
|---|---|---|---|---|
| CN | 119314445 | * | 1/2025 | G09G 5/10 |

OTHER PUBLICATIONS

Tien-Yan Ma, et al.; Automatic brightness control of the handheld device display with low illumination; May 2012; https://ieeexplore.ieee.org/abstract/document/6272797.

* cited by examiner

*Primary Examiner* — Vinh T Lam
(74) *Attorney, Agent, or Firm* — Trellis IP Law Group, PC

(57) ABSTRACT

An ambient light control system is provided to enable a display screen to display content in a light controlled environment by emitting light of a known quantity and/or color. In particular, light at the peripheral environment of the display is controlled in a manner that impacts the perceived quality of the content being displayed. In some implementations, sourced light is emitted by illuminators angled toward a rear surface behind the display screen for the light to be reflected back toward environmental areas at the outside edges of the display screen. Reflective parameters that characterize the rear surface may be used to define the brightness level and color of the sourced light to achieve a target ambient light at the edges of the display screen. Other environmental light may also be controlled, such as side lighting and remote controlled room lighting.

17 Claims, 7 Drawing Sheets

AMBIENT LIGHT CONTROL FOR DISPLAYING CONTENT

BACKGROUND

When viewing content being shown on a display screen, ambient light of the environment can greatly affect perceived quality of content. Content is created and edited (such as by a colorist) according to an assumed lighting that the content may be viewed under, which in the case of movies is often considered to be a dark place, such as 5 Nits. The light that surrounds a display screen has a particular impact on the ability to see the content as intended by the creators of the content. Content characteristics, such as brightness, contrast, and coloring may be adjusted based on this assumed ambient lighting. For example, a viewer in a dark room can typically see the dark scenes and bright scenes of a movie.

In actuality, viewing environments can vary and a viewer is often not inclined to be in such a dark area to watch the content. Instead, the content may be viewed in a brighter environment, such as 100-300 nits. As a result, dark scenes can appear washed out and highlights may not be visible.

Insufficient attempts can be made to improve content lighting to match ambient viewing light. Light sensors, e.g., ambient light sensors and incident light sensors, may be embedded in the display screen and relied upon to detect ambient light and adjust the content brightness accordingly. A plethora of environmental aspects can negatively impact sensor detecting of ambient light and such measurements are generally unreliable. These environmental influences can include light from the content being displayed, reflections off of furniture, spot lights, and so on, can distort measurements and introduce errors. Improvements to the technology of content display screens are needed.

SUMMARY

An ambient light control system (also called "light control system" or "system") is provided. The system includes a display screen with illuminators that control production of quantity and other characteristics of light in an immediate environment of the display screen. A target ambient light, such as brightness and color of a target light, is identified for peripheral edges of the display screen. To achieve the target ambient light, a determinations is made for the color and/or brightness of light to be emitted by the illuminators. The illuminators are controlled to illuminate, directly or indirectly, a portion of the environment proximal to at least one outside edge of the display screen.

An ambient light control method is provided that is implemented by one or more computers in which an ambient light control system controls light at an area proximal to a display screen. The system receives a request to display content on the display screen and identifies a target ambient light for a peripheral area proximal to at least one edge of the display screen. The system defines sourced light characteristics including defined brightness level and color for a plurality of illuminators, including illuminators spaced on a display screen, based at least in part on at least one reflective parameter of a rear surface. The illuminators are directed to emit light at an angle toward the rear surface with the defined brightness level, color, and any other light characteristics. The controlled light reflects off the rear surface to illuminate the peripheral area with the target ambient light. In still some implementations, a remote illuminator may also be controlled to emit a defined quantity of toward the at least one edge of the display screen. In some implementations, display screen settings may be adjusted to correspond with the target ambient light.

In some implementations of the light control method, reflective parameter of the rear surface used in defining the light charactertics include at least one of color, texture, paint finish, material that the light hits, and a distance of the rear surface from the plurality of illuminators. In certain cases, distance from the plurality of illuminators to the rear surface is detected and where the distance fails to meet a standard acceptable distance range, such as too far or to short, brightness level and color are defined with a correction for the suboptimal distance. Color of the rear surface may also be considered if the color reflects light at an irregular value of reflectance that fails to meet a predefined standard reflectance level. In these cases, color temperature of the emitted artificial light may be corrected for the substandard reflectance level. Reflective parameter may be received from one or more sources including: user input at a user interface, stored prior user input, a stored standard reflective parameter, or one or more sensors directed toward the rear surface.

The target ambient light is identified based, at least in part, on one or more ambient light factors to estimate ambient light characteristics that is desired, e.g., suitable for the user, content, environment, context of displaying the content, etc. The factors may be chosen, for example, from the group of: a type of the content, a standard viewing light, a user preference, historical user viewing behavior. At times, the target ambient light may be identified by employing an artificial intelligence (AI) model trained on typical ambient light corresponding to historical data. Historical user viewing data may be inputted into the trained AI model and output result from the AI model may be received, which indicates a predicted ambient light that corresponds with a user viewing pattern. The user viewing pattern may include a genre of movie, a particular movie, a viewing time of day, and/or user lighting conditions, among other viewing patterns.

In some implementations, an ambient light control system is provided, which includes one or more illuminators that are controlled to emit light to meet a target ambient light to display content. The system includes one or more processors and logic encoded in one or more non-transitory media for execution by the one or more processors. When the logic is executed, the logic is operable to perform various operations as described above in terms of the method. The operations include at least some of the methods described above and below.

In some implementations, a non-transitory computer-readable storage medium is provided which carries program instructions for controlling light proximally to a display screen to display content. These instructions when executed by one or more processors cause the one or more processors to perform operations for the ambient light control method as described above and below.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIG. 3A shows illuminators positioned on a back face of a display screen reflecting light off a rear surface and back toward the outer edges of the display screen, FIG. 3B shows illuminators positioned on a back face and positioned on sides reflecting light off a rear surface and back toward the outer edges of the display screen, and FIG. 3C shows illuminators positioned on a back face reflecting light off a rear surface and illuminators positioned on sides directly illuminating the outside side edges of the environment, in accordance with some implementations.

FIG. 4A shows a front face with outside edges illuminated, and FIG. 4B shows a back face with spaced illuminators, in accordance with some implementations.

DETAILED DESCRIPTION OF EMBODIMENTS

Figure 1:
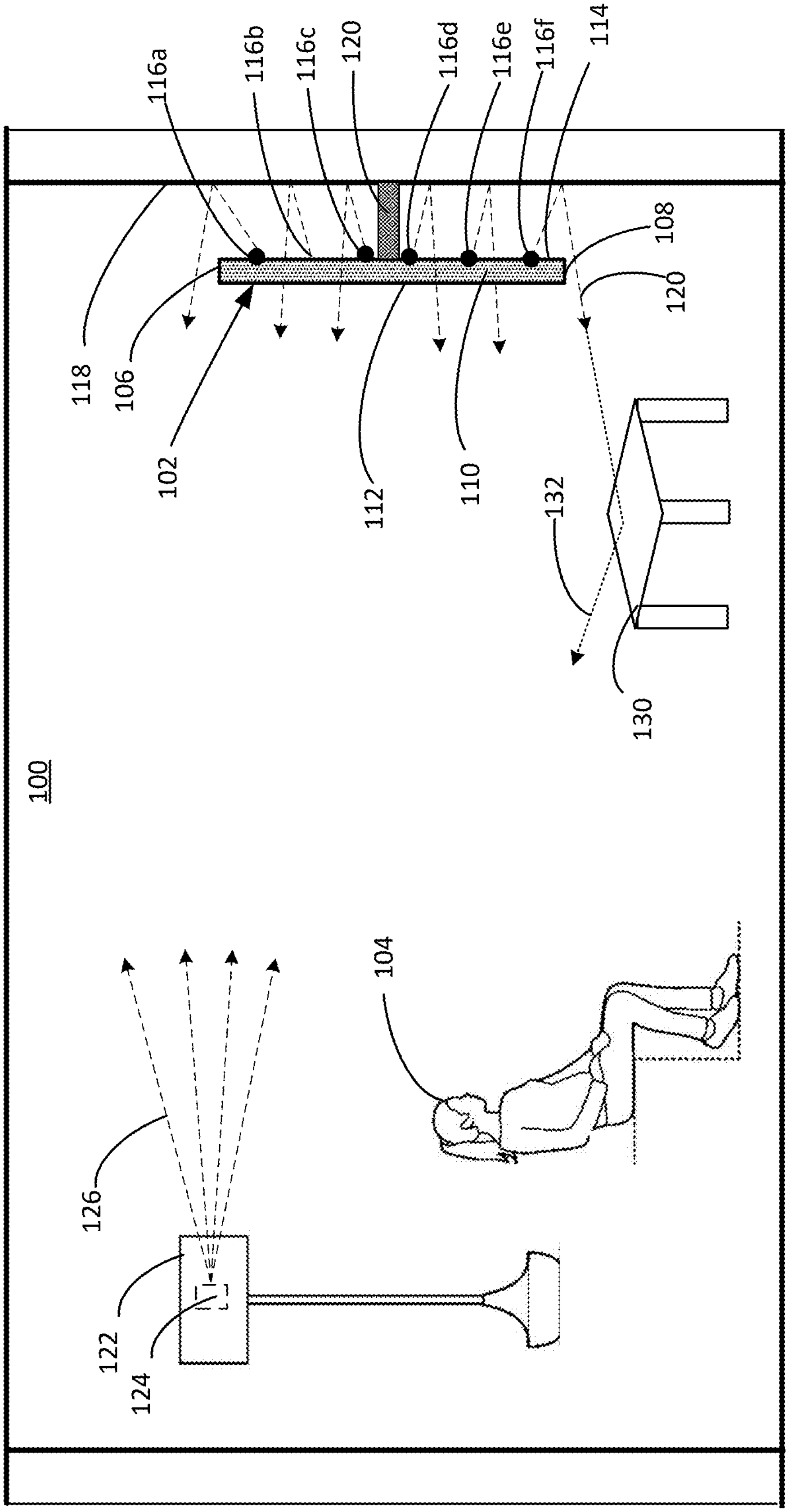
FIG. 1 is a conceptual diagram illustrating an example environment in which various aspects of the light control system may be employed, in accordance with some implementations.

The present ambient light control system enables a display screen to display content in a light controlled environment by emitting light of known characteristics, such as quantity and/or color. In particular, light at the peripheral environment of the display is controlled in a manner that impacts the perceived quality of the content being displayed. In some implementations, artificial light is emitted by illuminators angled toward a rear surface behind the display screen, or other fixed and recognized reflective surface in a position for the light to be reflected back toward the periphery of the display screen in a controlled and predictive manner. Reflective parameters that characterize the reflective surface, e.g., rear surface, may be used to define the brightness level and color of the artificial light to achieve a target ambient light at the outer edges of the display screen. The light is often diffused or otherwise dispersed to avoid hot spots. For example, a diffuser may be employed to emit light at 90-120 degrees dispersed light.

In some implementations, color temperature of a white light emitted from one or more illuminators (including all illuminators or groups of illuminators) may be controlled to accommodate different colorist settings of the content, such as 6500K (Kelvin). In some cases, a reflective surface, e.g., rear surface, may be a color that is a non-neutral color such as white or grey. The color temperature of the illuminators may be controlled to compensate for the color shift due to the color of the reflective surfaces. For example, a reflective surface, e.g., rear surface, that is red, reflects light that is reddish. The illuminators may emit a white light that is deficient in red to compensate.

Other environmental light, such as direct light that directly travels, e.g., not via reflection, to at least one edge of the display screen, may also be controlled. For example, other environmental light may include light emanating from the vertical sides of the display and remote controlled room lighting. For example, light may be emitted by illuminators facing outward from vertical sides of the display screen. In some implementations, one or more remote light sources in the environment may also be controlled to emit light of particular characteristic, such as a defined quantity of light, brightness level, and/or color (e.g., particular color temperature of a white light) into a larger area of the environment and traveling to the area proximal to the edge(s) of the display screen.

In some implementations, the content to be displayed may be adjusted to correspond with the target ambient light. In some implementations, the white level used by the display screen to show the content is detected and the color temperature of the emitted light is adjusted to match. In other implementations, the environmental light is controlled to match the content and at times, no adjustment to content lighting or coloring may be needed. By controlling the peripheral environmental light with known artificial light, use of light sensors are not required to adjust content to match the ambient environmental lighting.

The term "ambient light" as used herein refers to natural and/or artificial light (such as illuminator emitted light) in at least a portion of the environment proximal to the periphery of at least one side display screen. Ambient light can also encompass a greater portion of the environment including an entire room. Ambient light can be created and controlled by the system by diffused and/or indirect light from one or more illuminating sources. The term "environment" is used to describe a general area in which a display screen displays content, such as a room, outdoors area, theater, etc.

Reference to color of light as used herein, may include one or more various characteristics of colors including, spectral colors, non-spectral colors, hues, tints, shade, tone, and saturation, any or all of which may be controlled by the present light control system. Assessment and creation of different colors of light may include variations on color characteristics, which may be defined in terms of particular values and/or qualitative descriptions.

The "user" or "viewer" of the ambient light control system may be used interchangeably as applied in this description. The terms "user" and 'viewer refer to at least one person that uses the display screen of the ambient light control system, such as viewing content shown on the display screen. The singular version of these terms may also be assumed to incorporate multiple users and viewers.

The content is screen media that can be of a variety of different types and can include combinations of different content types. Types of content may include a recording of moving images, e.g., movie, recorded or televised sporting event, visual news reporting, video games, etc. Content types can also include still images such as photographs, paintings and digital art, etc. Other content types may include text such as documents, etc. Content types may be further divided into subtypes. For example, movies may be of various genres, such as animation, action, drama, horror, etc. The various types, including subtypes, of content may require particular ambient viewing lighting to properly view the content.

The nit metric measurement for luminance is employed herein to indicate brightness emitted from a light source, such as by a display screen showing content, artificial light in a room, reflectance of light from a wall, etc. Other units of measurements of luminance, such as candela, may be also be used without subtracting from the subject matter disclosed. In addition, units of measurements of light received, such as lux, can also be used without significant adaptation.

The term, "fails to meet" or variations of the term, indicates a value, characteristic, level, threshold, etc. that is above, below, or otherwise insignificantly different from a corresponding reference criterion (e.g., a value, characteristic, level, threshold, etc.), rather than being equal to or substantially equal to the corresponding criterion.

The present ambient light control system addresses issues that can arise when viewing content shown under varying lighting conditions. For example, daytime viewing with natural light streaming into a room may require a slight increase in display brightness, such as a medium range, to compensate for the extra light and maintain a balanced picture. Night time viewing in low light, on the other hand, may necessitate lowering of display brightness to reduce eye strain and prevent wash-out of images. Contrast may also need to be increased to enhance details and depth of content images. Where high ambient light or direct sunlight is present in a bright room, it may be important to maximize display brightness level to counteract glare, maintain image quality and prevent wash-out. Then again, a home theater environment may allow for less adjustments to view intended cinematic visuals and defaulting to the display's manufacturer's recommended standards. Other display devices may rely on manual changes of light settings of the display screen by a user to attempt to match ambient light.

Many viewers do not bother to take the time to make display changes or put in the effort understand how to properly change display settings for each change in environment lighting and content. Manual changes can be technical in being performed properly by a viewer. The user needs to estimate the ambient light, which may not accurately reflect light proximal to the display screen. For example, a display screen may be positioned in a dark corner of a well-lit room. A user correcting for general ambient lighting of a room may improperly adjust display setting for the room light and not the area closest to the display screen.

By the present light control system, environmental lighting is automatically controlled to match display settings and/or enable automatic adjusting of display settings to match the known controlled lighting, according to well defined characteristics of the room that impact display quality of the content.

A viewer will typically focus attention on a point in the content, such as a face, but the viewer sees more of the environment including beyond the display in a proximal area of the display. The brain of the viewer perceives a brightness of the content and integrates the area surrounding a point of focus, such as the peripheral area of the display screen.

Some other display devices may attempt to automatically adjust content lighting by seeking to measure environmental lighting. Light sensor technology can be expensive, complex, and generally unreliable. For example, some other display devices may measure room brightness immediately in front of the display with sensors in the display. But light emanating from the display screen will vary as content is shown. Such front sensor technology does not address the area surrounding the top, bottom and side edges of the display screen that largely impacts viewer perception of the content. Light sensors further inadvertently detect interferences in the lighting of the room, such as light bouncing off of a table or mirror. The present light control system avoids the reliance on expensive and undependable light sensing technology.

The present light control system circumvents such problems by providing illuminators positioned to supply light, directly or indirectly to the peripheral area of the display screen. Determination is made to identify a target ambient light and the artificial light is controlled to illuminate the area peripheral area of the display screen to match the target ambient light. Thus, by deterministically using known reflective parameters of the surrounding environment, controlling brightness and color of emitted light may be defined. By further positioning the illuminators the target ambient light may be achieved for display peripheral areas, which are of most significance in viewing content. The technological improvements include provide additional benefits and avoid prior limitations, which will be apparent by this description.

FIG. 1 illustrates an example use case of one implementations of the ambient light control system which controls lighting of at least a portion of an environment 100 that is proximal to the display screen 102, including areas proximal to a top edge 106, bottom edge 108 and vertical sides 110 (opposite vertical side not shown) of the display screen 102 by use of multiple illuminators, such as LED's. A user 104 (also referred to as a viewer) views content displayed on a front face 112 of the display screen 102.

The illuminators may include LED's with integrated lenses and diffusers for dispersion of light, to control emitted light according to the defined light characteristics needed by the illuminator. In some cases, the illuminator may be configured to emit a variety of red-blue-green (RBG) and/or white colors with different Kelvin scale numbers for different color temperatures. The color may be selected by the light control system to satisfy the identified target ambient light.

The light control system hardware components includes the display screen 102 and a plurality of illuminators **116*a*, 116*b*, 116*c*, 116*d*, 116*e*, and 116*f* spaced along the vertical length of the back face 114 of the display screen 102, opposite of the front face 112. A plurality of other illuminators (not shown) may be spaced along a horizontal length of the display screen 102, such as in alignment with the illuminators 116*a*-116*e* shown. In this manner, the illuminators may be dispersed along the back face 114** proximal to the edges of the display screen, both vertically and horizontally.

The number of illuminators and positions of the illuminators on the back face 114 can vary depending on a variety factors influencing the lighting needs, such the size of the display screen 102, reflectivity of the rear surface 118 behind the display screen facing the back face 114, a target ambient light, content being displayed, diffusion of light, etc. In some implementations, a plurality of illuminators may be coupled to the display screen and a select subset of the illuminators may be activated to emit light based on the lighting needs.

The number of illuminators is typically sufficient to evenly diffuse light along available edges (top, bottom, and vertical sides) of the display screen closest to the content being displayed. For example, where content is shown on a top portion of the display screen close to the top edge 106 and not on the bottom portion of the display screen close to the bottom edge 108, the illuminators may be positioned along the top of the back face and the bottom portion of the back face may be void of illuminators or likewise bottom illuminators may be deactivated.

The system may further include additional remote hardware components, such as a remote illuminator 124. Illuminators **116*a*-116*f* are directed toward the rear surface 118, such as a wall, to reflect light off of the rear surface toward the peripheral area proximal to the edges of the display screen 102** in a direction that reflects in a direction of the displaying of the content. In some implementations, other known reflective surfaces may be employed to reflect the light from the illuminators to travel past the periphery of the display screen in a direction of the display of the content. Such other reflective surfaces may be positioned, for example, at a corner, above, or sides relative to the display screen.

Illuminator 116*a* and 116*f* are positioned proximally to a respective top edge 106 and bottom edge 108 of the display screen. Light from the illuminators 116*a* and 116*f* is directed to the rear surface 118 and reflects to illuminate the area proximal to the respective top edge 106 and bottom edge 108. Illuminator 116*c* and 116*d* are positioned proximally to a first vertical side 110. Light from the illuminators 116*b* and 116*e* is angled backward to be directed to the rear surface 118 and reflects to illuminate the area proximal to the respective first vertical side 110. Illuminator 116*b* and 116*e* are positioned proximally to an opposite second vertical side (not shown), respectively. Light from the illuminators 116*b* and 116*e* is directed to the rear surface 118 and reflects to illuminate the area proximal to the opposite second vertical side (not shown). Although single line rays are used to reference light rays for illustration purposes in FIG. 1, artificial light emitted from the illuminators is often diffused.

The display screen 102 is often generally stationary the environment 100. A stationary display screen 102, however, may be adjustable to change orientation, such as pivotable on mount 120 attached to the rear surface 118 to provide for tilt and/or swing distance from the rear surface. It is possible for the display screen 102 to be portable as well. The display screen can often be used to display moving images, such as a television, computer display, phone display, etc. The display screen 102 may also be a component of other devices used to display content, such as a kiosk and other devices serving multiple purposes and having a display screen, etc. In some implementations, the display screen 102 may be dedicated to displaying still images such as a digital picture frame, information board, etc.

The display screen 102 shows content on the front face 112 and can include a variety of types, such as moving images, e.g. movies, television programs, videos, etc. Content types may also include still images, e.g., photographs, websites, and may also include text, symbols, etc. The display screen 102 is assumed to be static in the environment during the showing of the content. The proximal portion of the environment 100 is an area that surrounds at least one side of the display screen 102 in which ambient light impacts the viewing of the content by a user 104. The content is typically projected on the display screen rather than projected into a space. However, the display screen can receive the content from an external source and the content is shown on the display screen, such as from a movie projector source.

Remote lighting may be controlled such as lamp 122 via remote illuminator 124 controlled by a receiver (not shown) that receives control signals from the display screen 102. Dispersed light 126 the lamp 122 in the environment 100 may be directed to emit a remote brightness level and/or remote color that is controlled to reach the peripheral areas of the display screen. In some implementations, a display screen may be too close to a rear surface for proper light reflectance to the display screen peripheral area, or there may be no rear surface for reflection. In such cases, outward directed side illuminators may be provided. However, in some instances there may be no or insufficient useable illuminators on the display screen, such as where a display screen is flush to wall or embedded in a hole in wall. In these cases, externally controlled light sources, such as lamp 122 may be more relied upon to reach the target ambient light.

The remote light characteristics of the remote illuminator 124 are different than the defined light characteristics of illuminators coupled to the display screen. For example a greater distance between the remote illuminator 124 to the periphery of the display screen requires a brighter light than reflected light from display screen illuminators.

Nevertheless, the light control system can control artificial light without using light sensors, such as on the front of the display screen. As such potential obstructions to light measurements, such as light 132 reflecting off of table 130 from illuminator 116*f*, does not interfere with the controlled light 120 at the bottom edge 108 of the display screen 102. The table reflected light 132 travels in a random direction into the room environment and does not pass proximally to the periphery of the display screen. As such, the reflected light 132 does not contribute to the target ambient light.

Figure 2:
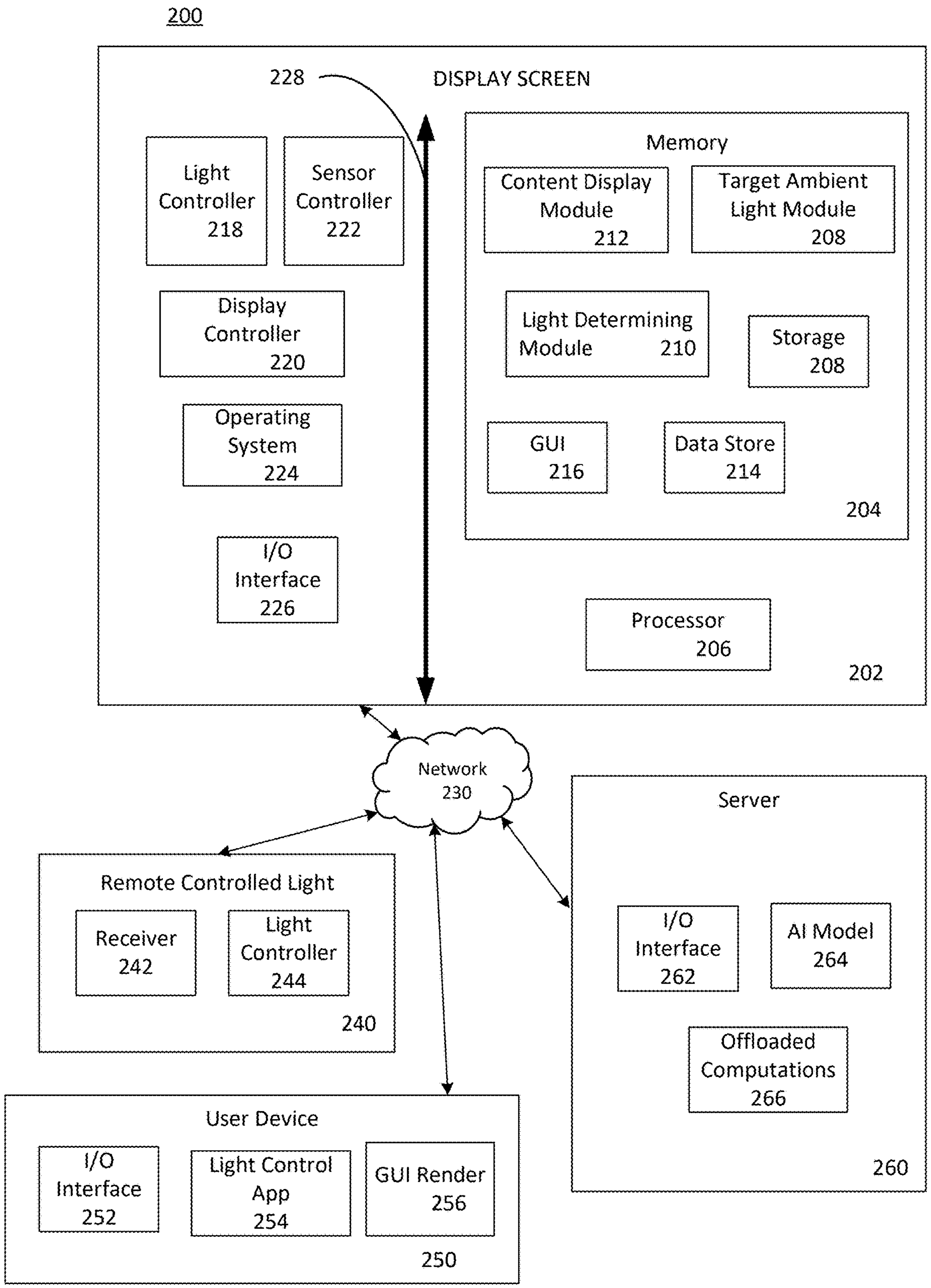
FIG. 2 is a block diagram of example electrical components of the light control system, in accordance with some implementations.
Figure 5:
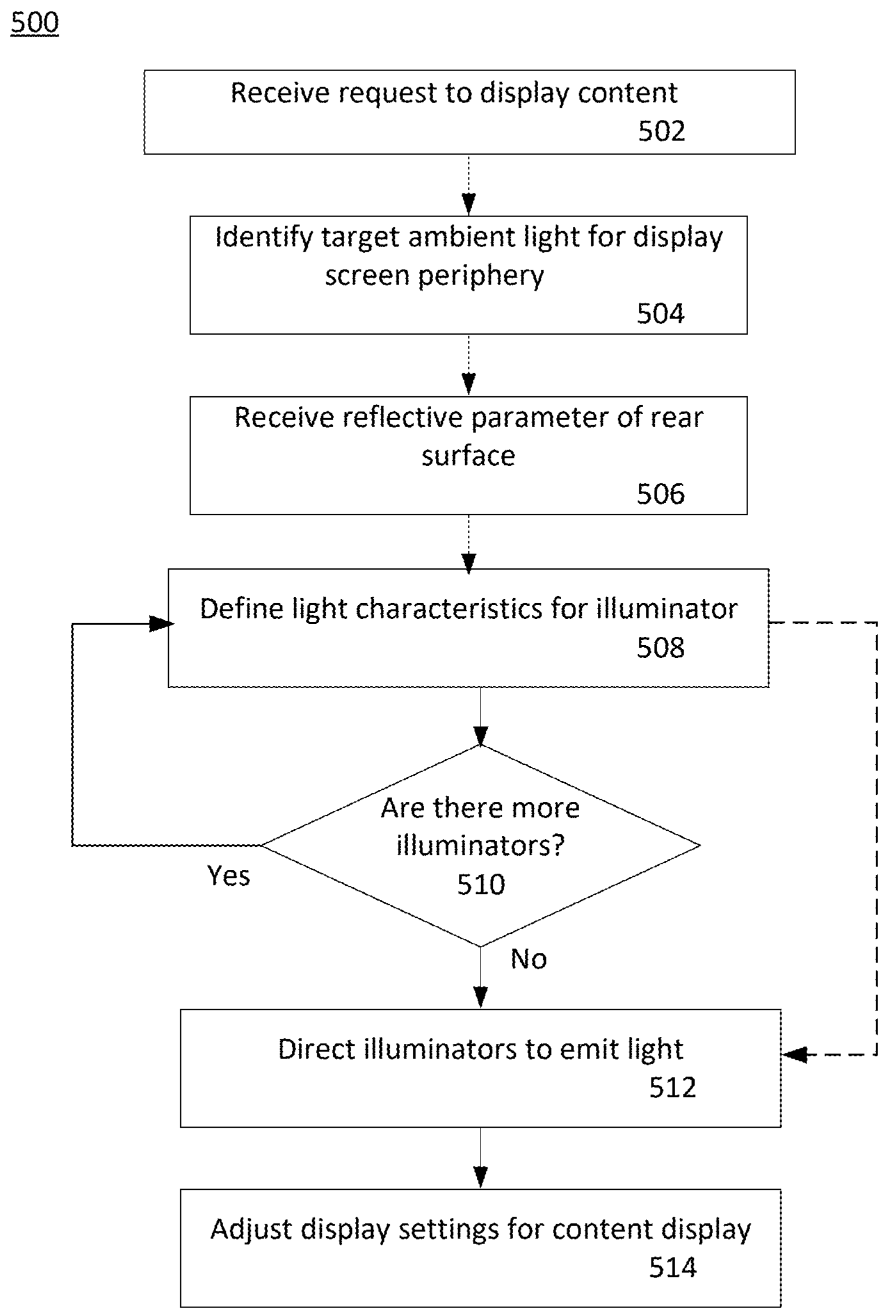
FIG. 5 is a flow diagram of an example method diagram of an example method for a display screen to illuminate a peripheral space, in accordance with some implementations.
Figure 6:
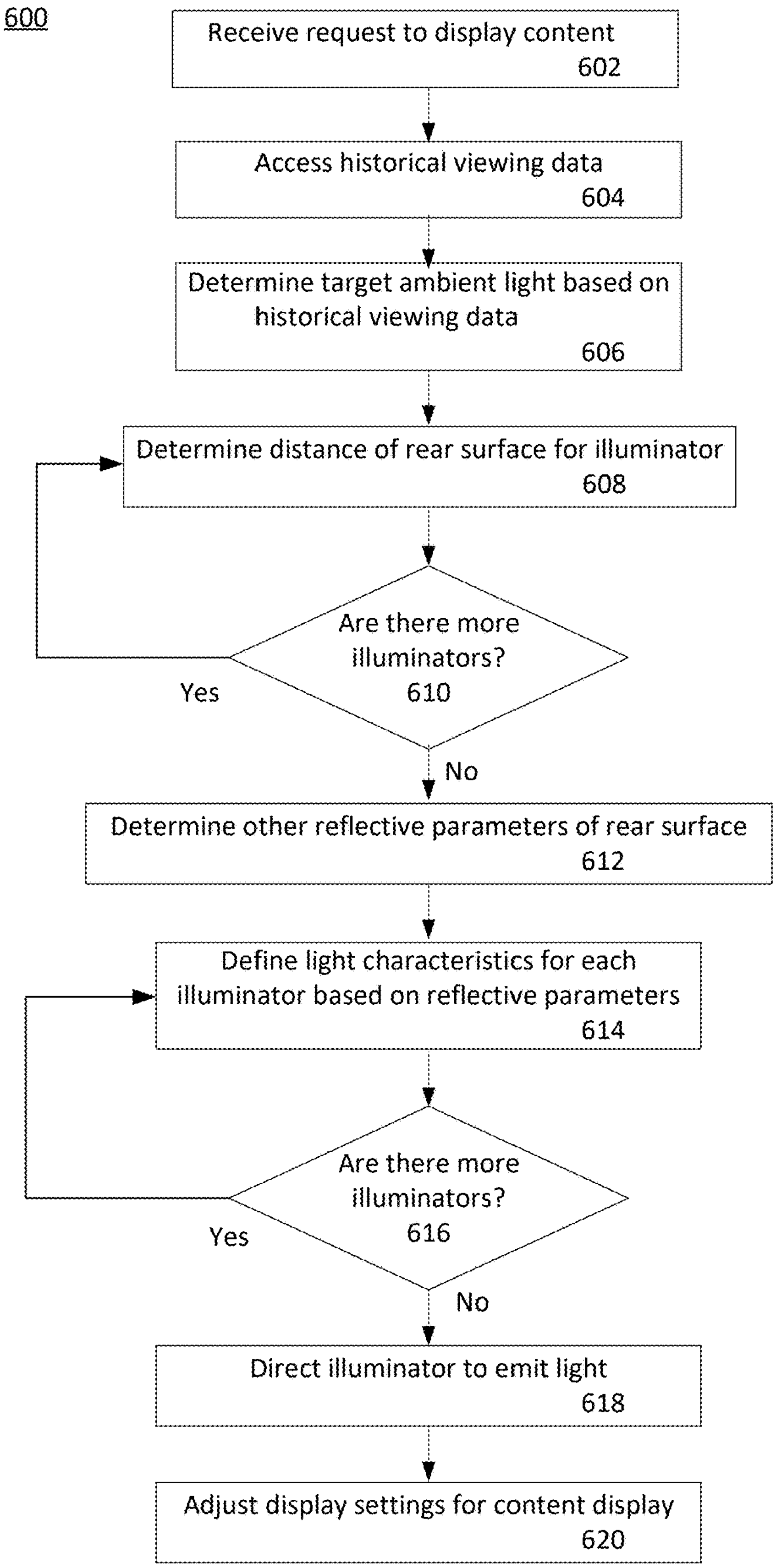
FIG. 6 is a flow diagram of an example method of adaptive light control, in accordance with some implementations.

As shown in FIG. 2 shows a block diagram of electrical components of one example implementation of the light control system 200 by which various of the steps of the light control processes describe with regards to FIGS. 5 and 6 may be performed. In the illustrated implementation, components of the light control system 200 includes a display screen 202, which displays content for one or more users to view.

In some implementations, various additional remote components may be connected via network 230, such as one or more remote controlled lights 240 and/or one or more user devices 250. Remote illuminators of the remote controlled light 240 may receive control signals via receiver 242 from the display screen view various communication mechanisms, such as Wi-Fi, Bluetooth, Zigbee, etc. Control signals may include activation and deactivation of the remote controlled light, based on the need of additional room lighting determined by the system. Control signals may also include remote light characteristics, such as brightness level and/or color determined appropriate from the remote light source to meet the target ambient light.

Remote components of the system 200 may also include one or more servers 260, which may serve to offload various computations from the display screen 202 via one or more offloaded computations module 266 that may be the same or similar to modules described below of the display screen 202. For example, libraries may be stored remotely at a server and the server may match reflective parameters with light characteristics required for a target ambient light. In some implementations, the display screen 202 is self-contained and no other components are necessary to perform the light control process. In other implementations, one or a combination of the additional remote components as well as the display screen 202 may be employed as shown in FIG. 2.

The display screen 202 includes hardware and/or software to perform operations to determine, such as operations described below with regard to FIGS. 4-5. For example, the display screen 202 includes one or more processor(s) 206 and logic encoded in one or more non-transitory media for execution by processor(s) 206 and when executed operable to perform the operations. In other implementations, at least some of the hardware and/or software may be in other parts of the light control system, such as user computing device 250 and/or server 260, rather than, or in addition to, onboard functions at the display device 202. In some implementations, certain processes may be offloaded to the server 260 and/or user computing device 240, or a combination of steps may be performed by the various applications.

Memory 204 may include solid state memory in the form of NAND flash memory and storage media 208. The display device may include a microSD card for storage and/or may also interface with cloud storage server(s). Memory 202 and storage media 208 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 214 may be employed to store various on-board data, such as stored prior user behavior, user preferences information, prior used light characteristics (e.g., brightness level, color) for specific illuminators or all illuminators, prior used content light settings for particular content, reflection parameters for a rear surface, etc.

Various application and/or modules are stored in memory 204 to perform functions of the light control process. Target ambient light module 208 includes logic to perform identification of light characteristics (e.g. brightness level and color) that is intended to be achieved by the light control system at a peripheral area proximal to at least one side of the display screen. Light determining module 210 defines illumination characteristics, such as brightness level, color, angle of emission of one or more illuminators, etc. for the illuminators to emit controlled light by considering reflective parameters. In some implementations, predictions of rear surface reflectance to 30-40% may be sufficient to define light characteristics that provide for artificial light that sufficiently meets the target ambient light. Content display module 212 may adjust display settings to show the content to correspond with the target ambient light. Other modules and applications are possible.

The modules may communicate with various controllers to control devices according to module computations. For example, display screen includes a light controller 218 that controls illuminators in accordance to light characteristics determined by light determining module 210. Display controller 220 controls settings for display of content according to content display module 212. In some implementations, where sensors are employed to determine, for example, reflectivity parameters, sensor controller 222 may control such sensors.

Identification of desired ambient light by target ambient light module 208 may employ various ambient light factors upon which to base the target ambient light. In some implementations, a standard viewing light level is stored as a preset unless changed due to changing factors. Such ambient light factors may vary when content is displayed and may need to be periodically redetermined. For example, the type of content intended to be displayed may impact a desired target ambient light. Types of content that may impact a target ambient light may include movies, sports, and video games, text, black and white images. Other ambient light factors may include a user preference (e.g. stored in data store 214 or user input at I/O interface 226), and/or a stored historical user viewing behavior. Other ambient light factors may include a context in which content is displayed. For example, where the content includes text shown in a public that is important for a viewer to read, ambient lighting may be configured for black and white clear presentation of the text. Where the content is intended as calming background images, the target ambient light may be duller than personal viewing of movies.

In some implementations, an artificial intelligence (AI) model may be employed to predict a target ambient light, for example as described below in FIG. 6 and trained for example according to FIG. 7. In some implementations, AI model 264 may be stored, trained, and implemented by server 260, in which display screen 202 transmits ambient light factors to be received by I/O interface 262 of the server 260 and receives output of predicted results from AI model 264.

The reflective parameters are used by light determining module 210 to define the illumination characteristics of one or multiple of the illuminators, including all of the illuminators. Reflective parameters may be integrated into a formula used to calculate the illumination characteristics. Reflective parameters may correspond with reflective values that correspond with light characteristics needed to compensate for the reflective value. scale. In some implementations, rear surface reflectivity value may be assumed depending on the environment type. For example, a rear surface of a home theaters may be assumed to have low reflectivity value.

Some reflectivity parameters may be inherent properties of the rear surface, such as color, texture, finish, material, etc. Colors of the rear surface, for instance, can influence light reflectance. A default color may be assumed to be white or variations of white (off-white, cream, etc.), which has a high reflectivity value. The default color may be associated with a standard reflectance level which typically correlates with the high reflectivity value. However, variations in color and/or color temperature of the reflective surface may be associated with an irregular reflectance value that fails to meet the standard reflectance level, in which case the illuminator(s) may be controlled to compensate for the variation in reflectance. The standard reflectance level may be defined according to typical reflectivity parameters, such as a common color, e.g., white or the like.

A medium high reflective value may be used for yellow rear surfaces, while orange may have a medium reflectivity value. Where a rear surface is painted red, the reflectivity value can be low medium. A low reflectivity value may be associated with a rear surface color of blue or green. The light determining module 210 may adjust color temperature of illuminators to correct for reflective color surface that fail to meet the predefined standard reflectivity level, which can include a range of standard reflectivity levels that fall within a acceptable reflectivity levels that produce the target ambient light within an acceptable accuracy, such a 80% or 90% accurate in producing the target ambient light. Where different portions of a rear surface has different colors, illuminators proximal to the varied color portions may need to be separately controlled to emit light according to different light characteristics corresponding with the rear surface color.

Other inherent reflectivity parameters of the rear surface may include a texture of the surface, such as smooth, suede, rough, etc. A paint or stain finish may also impact reflectivity. For example, a high-gloss finish may be associated with a high reflectivity value due to a smooth, mirror-like surface. By contrast, a low glossy or flat finish, or a matte finish may be assigned a low reflectivity value due to scatter light in multiple directions, resulting in a soft, non-reflective surface. A medium reflectivity value may be associated with an eggshell finish with a slight sheen. However, black out paint would have a low reflectivity value. Finish types may be also described in terms of a sheen. Additionally, the material(s) that compose the rear surface can be associated with reflectivity values as reflectivity parameters as well. For example, materials that may impact reflectivity values may include plasterboard, concrete, brick, wood, metal, and tile. In some implementations, material types are combined with other reflectivity parameters such as color, texture and finish to determine a reflectivity value for the rear surface.

In some implementations, a distance of the rear surface from the plurality of illuminators may be a reflectivity parameter. In some implementations, various illuminators may be positioned at varying distances from the rear surface. For example, the display screen may be tilted such that the back face of the display screen on one portion of quadrant of the display screen may be a different distance relative to the rear surface.

A single reflective parameter may be considered or any combination of reflective parameters may be collectively used to determine light characteristics. In some implementations, certain reflective parameters may be associated with weights to more favorably employ some reflective parameters as more having more significant impact on the target ambient light, than other parameters, which have less significance.

The reflective parameter(s) of the rear surface used to define illumination characteristics by the light determining module 21 may be received from a variety of different sources. For example, an internal clock may provide a time of day of the content viewing. Where content is displayed during the afternoon in a room that has natural lighting, the light characteristics may be adjusted by lowering the brightness needed.

Other reflective parameter sources may include user input at a user interface, stored prior user input, a stored standard reflective parameter, or one or more sensors directed toward the rear surface. In some implementations a graphical user interface (GUI) 216 may be generated by the display screen to enable the user to enter reflectivity parameter information, such as a color, texture, finish, material, distance from the display screen, and the like, of the rear surface or other reflective surface that effects the target ambient light. In some implementations, default reflectivity parameters may be stored in the system, such as in data store 214 and the user can edit or accept these standard properties or input new properties via the GUI 216 that may be displayed and controlled by display controller 220. User input signals may be received via I/O interface 226. The updated reflectivity parameters may be stored in data store 214 for future use in displaying content.

The I/O interface 226 may be enabled for wired and/or wireless communication, such as via Wi-Fi, Bluetooth, Bluetooth Low Energy (BLE), radio frequency identification (RFID), etc. In some implementations, display screen 202 may also include software that enables communications of I/O interface 226 over a network such as HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

In some implementations, a light control application 254 may be running on the user computing device 250, such as a smart device of the user, e.g., smartphone, smart watch, etc. for the user to enter information via a GUI render 256 and transmit the data via I/O interface 252.

In some implementations, the light control system may employ various sensors to detect reflectivity parameters of the rear surface. For example, a distance sensor, such as ultrasonic range finder, lidar, infrared sensor (IR), LED time of flight sensor, etc. may be used to detect and measure distance to rear surface. Various distance sensors may be employed that output a signal from the display screen to the rear surface and measure a change when the signal returns. Signals may include as ultrasonic waves, IR, LED, etc. In some implementations, a proximity sensor may be employed to determine whether the distance is within an acceptable proximity range, rather than measuring the distance.

Where the distance fails to meet an acceptable standard distance range such as 12 to 24 inches, the light characteristics may be corrected, such as increasing or decreasing the brightness level and changing color. The orientation of the illuminator of one or more illuminators may also be adjusted to change the angle of emittance and accommodate the distance. In some cases, the distance to the rear surface may be changed, such as by a swinging arm mount of the display screen. And the orientation of the illuminator may need to be changed accordingly. Angle of the illuminator may be adjusted manually by the user or automatically by the display screen, such as via light controller 218. In this manner, the light reflects at the intended area of the environment proximal to an outside of the display screen. In some implementations, where the distance is below a standard acceptable distance range and falls below a minimum required distance, e.g., 2 inches, the light control system may deactivate the illuminators at the below minimum distance and activate alternatively positioned illuminators, such as illuminators on the vertical sides of the display screen and/or remote illuminators.

In some implementations, the display screen may be tilted or the rear surface may not be parallel to the back face of the display screen. Multiple distance sensors may be spaced on the back face to capture the varying distances of the different illuminators to the rear surface. In these circumstances, light determining module may define different light characteristics, e.g., brightness level, color, angle of emittance, for clusters of illuminators that are close to each other, or for each individual illuminator.

A rear facing camera may also be used to detect reflectivity parameters such as rear surface color, texture, finish. Other sensors directed to the rear surface may include Lidar, ultrasonic sensors, etc. There is a minimum reflectivity level that is needed for the rear display illuminators to function properly. For example, is it assumed that the rear surface is not a black out surface or translucent/transparent as in a window.

The display screen 202 further includes an operating system 224 to control and manage the hardware and software of the display screen 202. An operating system 224, that supports the light control processes may be employed, e.g., IOS, Android, Windows, MacOS, Chrome, Linux, etc.

Other common system components may be included, such as integrated circuit (IC), speaker components, and computer chip-embedded amplifier to receive sound input and convert electrical signals from the microphones to digital signals. The IC may include a digital-to-analog converter (DAC) or analog to digital converter (ADC). A bus 228 may interconnect display screen components.

The network 230 may include a local area network, a wide area network, a wireless network, an Intranet, the Internet, a private network, a public network, a switched network, cellular, wired connections, or any other communication network, such as cloud networks, suitable for connecting the components. For communication of some system components, the network 230 may include a short-range connection between various system components, such as Bluetooth Low Energy (BLE), Bluetooth, Zigbee, etc. Other connections are possible such as wide band and ultra-wide band.

Other configurations of the light control system 200 may be employed and are considered within the scope of this disclosure. Various designs and configurations of display screen may be used. In some implementations, a server, user computing device, and/or remote light need not be employed.

Figures 3A, 3B, 3C:
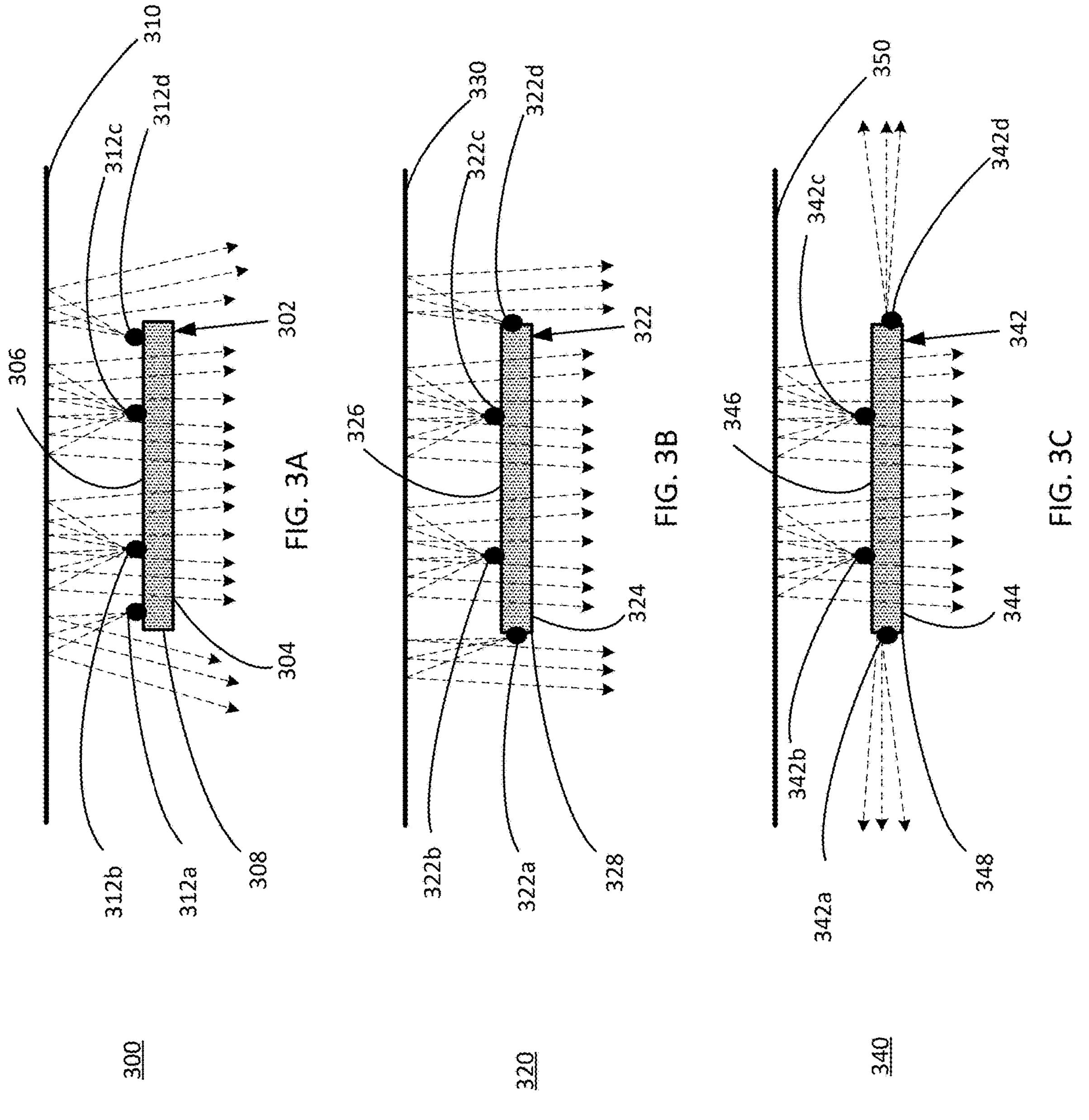
FIGS. 3A, 3B, and 3C are plan view conceptual diagrams of various example illuminating configurations of peripheral areas of a display, where

FIGS. 3A, 3B, and 3C are plan view (top down) conceptual diagrams of various example illuminating configurations of peripheral areas of a display. Light emitted by the illuminators is diffused to present multiple dispersed rays of light, avoiding hot spots of light concentration. In this manner, a wide area proximal to the edges of the display screen may be covered by a single illuminator.

In one example illuminator configuration 300 represented in FIG. 3A, various illuminators 312*a*, 312*b*, 312*c*, and 312*d* are positioned on a back face 306 of a display screen 302 to emit light in the direction of rear surface 310. Diffused light is emitted by illuminators 312*a*-312*d* at an angle relative to the rear surface sufficient to enable the light to reflect off of the rear surface to the direction of the front face 304 of the display screen 302. Illuminator 312*a* is angled for light to reflect to a side 308 of the display screen and illuminator 312*b* is angled for light to reflect to the opposite side of the display screen 302. Illuminators 312*b* and 312*c* are angled for light to reflect over the top edge of the display screen 302. Similar illuminators may be positioned to emit light to reflect over the bottom edge of the display screen 302.

In another example illuminator configuration 320 represented in FIG. 3B, illuminators are positioned on both a back face 326 and sides 328 reflecting light off of the rear surface 330. Diffused light is emitted by illuminators 322*a*-322*d* at an angle relative to the rear surface sufficient to enable the light to reflect off of the rear surface to the direction of the front face 324 of the display screen 322. Illuminators 322*a* and 322*d* are positioned on sides 328 and angled for light to reflect to opposing sides 328 of the display screen 322. Illuminators 322*b* and 322*c* are on back face 326 and angled for light to reflect over the top edge of the display screen 322. Similar illuminators may be positioned to emit light to reflect over the bottom edge of the display screen 322.

In yet another example illuminator configuration 340 represented in FIG. 3C, illuminators are positioned on a back face 346 reflecting light off the rear surface 350 in the direction of front face 344. Illuminators 342*a* and 342*d* are positioned on sides 348 directly illuminating the sides areas of the environment proximal to the display screen 342. Such light may be emitted at about 90 degrees (generally since light is often diffused from the illuminator) from the front face of the display screen. Illuminators 342*b* and 342*c* are on back face 346 and angled for light to reflect over the top edge of the display screen 342. Similar illuminators may be positioned to emit light to reflect over the bottom edge of the display screen 342.

Figure 4A:
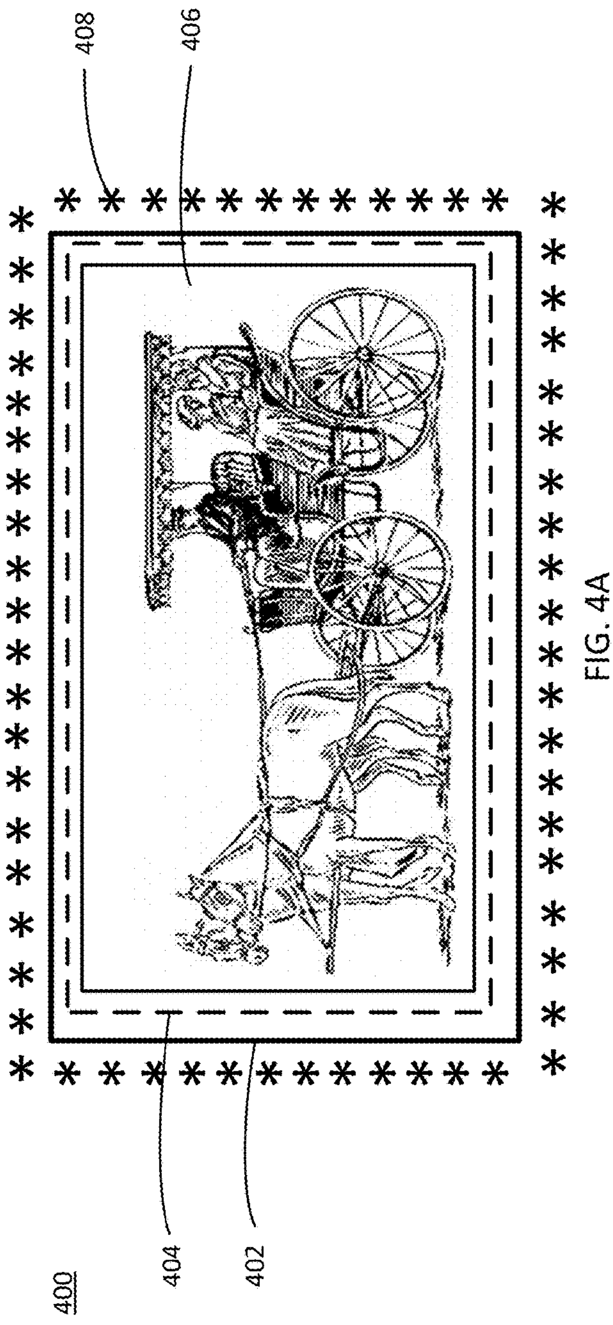
FIGS. 4A and 4B is a conceptual diagram illustrating examples of the faces of the display screen, where
Figure 4B:
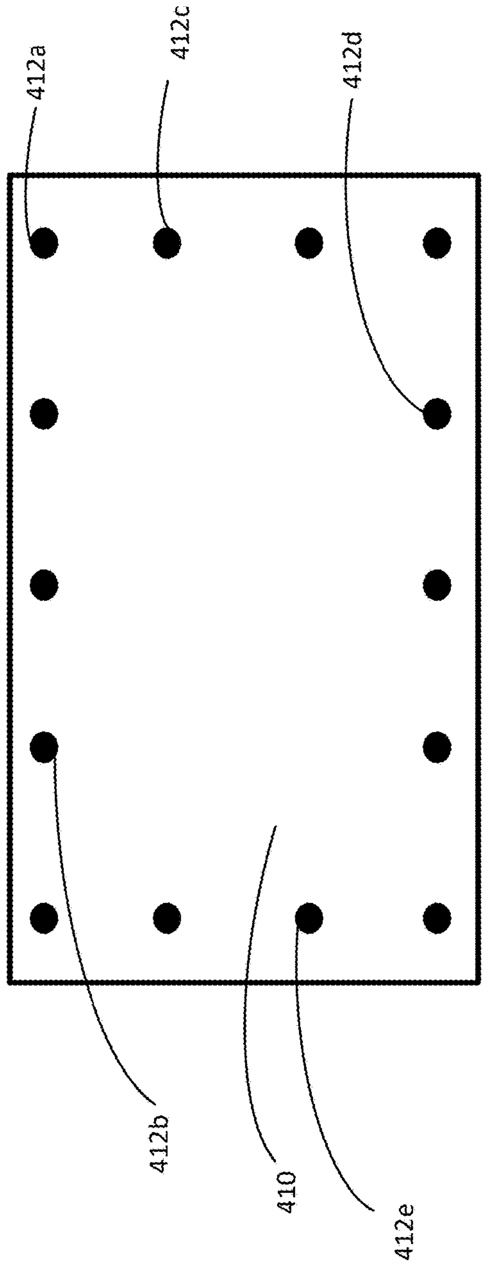

FIGS. 4A and 4B is a conceptual diagram illustrating examples of the faces of the display screen 400. FIG. 4A shows a front face 402 of the display screen 400 with peripheral areas illuminated. The display screen 400 includes a screen 404 that shows content 406. The peripheral areas proximal to the edges of the display screen 400 are lit with diffused light 408 that is reflected off of a rear surface to at least substantially cover the area surrounding the display screen 400. FIG. 4B shows a back face 410 of the display screen 400 with spaced illuminators 412*a*-412*e*. Corner illuminators 412*a* are angled and include diffusers to control the reflected light to cover an area at the respective top/bottom as well as side areas of the display screen. Illuminators 412*b* are angled to allow reflected diffused light to cover respective top areas and illuminators 412*d* similarly cover bottom areas. Illuminators 412*c* and 412*e* are angled to allow reflected diffused light to cover respective side areas.

FIG. 5 shows a flow chart of a light control process 500 performed by the light control system, for example system 200 shown in FIG. 2 and in some implementations performed by display device 202 in FIG. 2.

In block 502, a request is received to display certain content. Such request may be received from an action of the user. For example, a user may select content to be viewed, which may trigger the light control system to be activated. In some implementations, the request may be automatically provided by the system or remote devices, such as triggered by an event, e.g., at a certain time in which the content is to be displayed.

In block 504, target ambient light is identified for the peripheral area of the environment proximal to the display screen, according to the descriptions presented herein.

In block 506, one or more reflective parameters of the rear surface are received, according to the descriptions presented herein. In block 508, based, at least in part, on the reflective parameters, light characteristics, e.g., brightness level and/or color, are defined for the illuminators to emit light. In some implementations, the light characteristics may include adjustments to angle of emittance of illuminators, such as varying illuminator orientation.

In decision block 510, it is determined whether there are more illuminators that require different light characteristics. If there are more illuminators, the process return to block 508 to define specific light characteristics for the next illuminator(s). If no more illuminators need different light characteristics or all illuminators have the same light characteristics, the process proceeds to block 512.

In block 512, illuminators are directed to emit light according to the light defined characteristics. In some implementations, one or more illuminators may be activated while other illuminators may be deactivated where not all illuminators are deemed necessary to achieve the target ambient light. Where different illuminators are determined to emit different light characteristics, different controls are provided to the respective illuminators or cluster of illuminators.

In decision block 514, display screen settings may be adjusted to correspond with the target ambient light. Display adjustments may be needed for particular content so that the controlled lighting of the viewing environment is similar to the prior content editing environment for the viewer to see the picture correctly. Setting adjustments may vary according to the type of display screen. For example, high dynamic range (HDR) televisions may allow for more adjustment range, e.g., 1000-10,000 nits, than standard dynamic range (SDR) television ranges of up to 1000 nits. With the use of the present light control system, adjustments needed to display screen settings may be minimal.

Variations of the light control process in FIG. 5 are possible, including variations in order of steps, additional steps added, unsubstantial removal of steps, or unsubstantial changes to steps, while remaining within the scope of the light control process described.

FIG. 6 is a flow chart of a light control process 600 that adapts light control to circumstances of the viewing environment and/or viewer. The adaptive light control process is performed by the light control system, for example, system 200 shown in FIG. 2 and in some implementations performed by display device 202 in FIG. 2. Adaptive processes can include changing parameters and/or factors that are assessed with each time content is displayed, updated as the content is being displayed (e.g., during light or dark content scenes), assessed when content type or substance is changed, a different viewer is present or changes during display of the content, etc. Some parameters and/or may be assessed once and stored for future viewing times without reassessing, unless directed to be reassessed by a user or other significant changes, such as a display screen being relocated to a different environment, reset or reboot of settings, loss of stored data, etc.

In block 602, a request to receive content is received, as described above in block 502 of FIG. 5. In some implementations, certain conditions may activate or deactivate the light control features described herein, according to determined lighting needs. For example, where the typical ambient light, as determined by historical viewing data, shows that no artificial lighting is needed to compensate for environmental lights, the light control features may be deactivated. The light control features may be activated where artificial lighting is found to be needed based on factors such as the content, time of day, location of the display screen, etc. Whereas such features are activated, the system proceed to steps in FIGS. 5 and 6.

In block 604, historical viewing data is accessed for use as an ambient light factor in identifying a target ambient light. Historical viewing data may include user viewing patterns including past target ambient light characteristics used for a same content, a similar content, such as genre of movie or particular movie title, a same user, a typical viewing time of day, past user lighting conditions, etc. For example, content that is known to have significant dark scenes may result in a target ambient light that facilitates viewing of the dark scenes. In some implementations, past user viewing behavior may be stored as historical viewing data, such as past manual adjustment by the user to source light from the illuminators.

The historical viewing data may be used to determine a target ambient light in block 606. In some implementations, additional ambient light factors may be used, such as user preferences that are inputted by a user. In some implementations, various users may input preferences, which are stored and retrieved upon the user signing into the system. Some users may prefer a brighter and more vibrant image, while others may prefer a more natural and subdued look. In some implementations, various ambient light factors may be assigned weights to increase or decrease an importance of the factor in identifying the target ambient light.

In block 608, the distance from the illuminators to the rear surface is determined. Distance parameter may be inputted by a user or detected by the distance sensors of the display screen. The distance parameter may be determined for each illuminator, for groups of illuminators (such as clusters positioned on quadrants of the display screen), or assumed to be substantially the same for each illuminator. In some cases, where an orientation sensor, such as an accelerometer, gyroscope, magnetometer, and the like, detects that the display screen is tilted on a support arm or a rear surface is not substantially parallel with the back face of the display screen, the distance sensors may be activated to determine distance from the rear surface. In some implementations, orientation sensors may function with an encoder scale to measure linear and rotational movement of the display device. The orientation data may be attributes using transform coding techniques to translate distance data to light characteristics needed to meet the target ambient light. Distance determination may be remeasured upon certain events, such as detection of moving of the display screen above an acceptable move threshold. In some implementations, the distance measurement may only be needed once.

In decision block 610, it is determined whether there are more illuminators that are positioned at a different distance to the rear surface and that the difference fails to meet a standard acceptable range of distance variations. If there are more illuminators or groups of illuminators, the process return to block 608 to determine the different distances for the next illuminator(s), including groups or clusters of illuminators. If no more illuminators fall outside of the standard distance, the process proceeds to block 612.

In block 612, other reflective parameters, if any, in addition to the distance parameter, are determined. Reflective parameters include properties of the rear surface or other reflective surface, such as a side reflective surface to reflect side positioned illuminators, that may significantly impact reflectance of light, above an acceptable threshold variation tolerated. Other reflective parameters may include, for example, rear surface color, texture, paint finish, type of material of the rear surface that the light hits.

In block 614, light characteristics including brightness level and color for each illuminator, cluster of illuminators or all illuminators, are defined based, at least in part, on reflective parameters. In some cases, different individual or clusters/groups of illuminators may be associated with different light characteristics.

In decision block 616, it is determined whether there are more illuminators including groups of illuminators that are associated with different light characteristics for emitting light. If there are more illuminators, the process return to block 612 to define light characteristics for the next illuminator(s). If no more illuminators need different light characteristics, the process proceeds to block 618.

In block 618, illuminators are directed to emit light according to the light characteristics, for example, via light controller 218 in FIG. 2. In some implementations, light characteristics include changes to orientation of one or more illuminators or otherwise change the angle of light emittance, to direct light to the intended outer peripheral area of the display screen.

In some implementations, the display screen may include one or more position adjusters that correspond with one or a cluster of illuminators. In some implementations, the position adjuster may be automatically driven by the display screen to change orientation of the illuminator according to a calculated shift required to emit light at an appropriate angle to enable reflected light to hit an intended outer peripheral area of the display screen. In still some implementations, the position adjuster may be configured for manual movement by the user to adjust illuminator orientation.

In block 620, display settings may be adjusted, if needed to correspond with the target ambient light. For example, a level of brightness and/or color of the displayed content may be changed to adjust for the known target ambient light. In other implementations, the target ambient light meets the intended viewing light anticipated by creators of the content and no adjustment of the display settings may be required.

Figure 7:
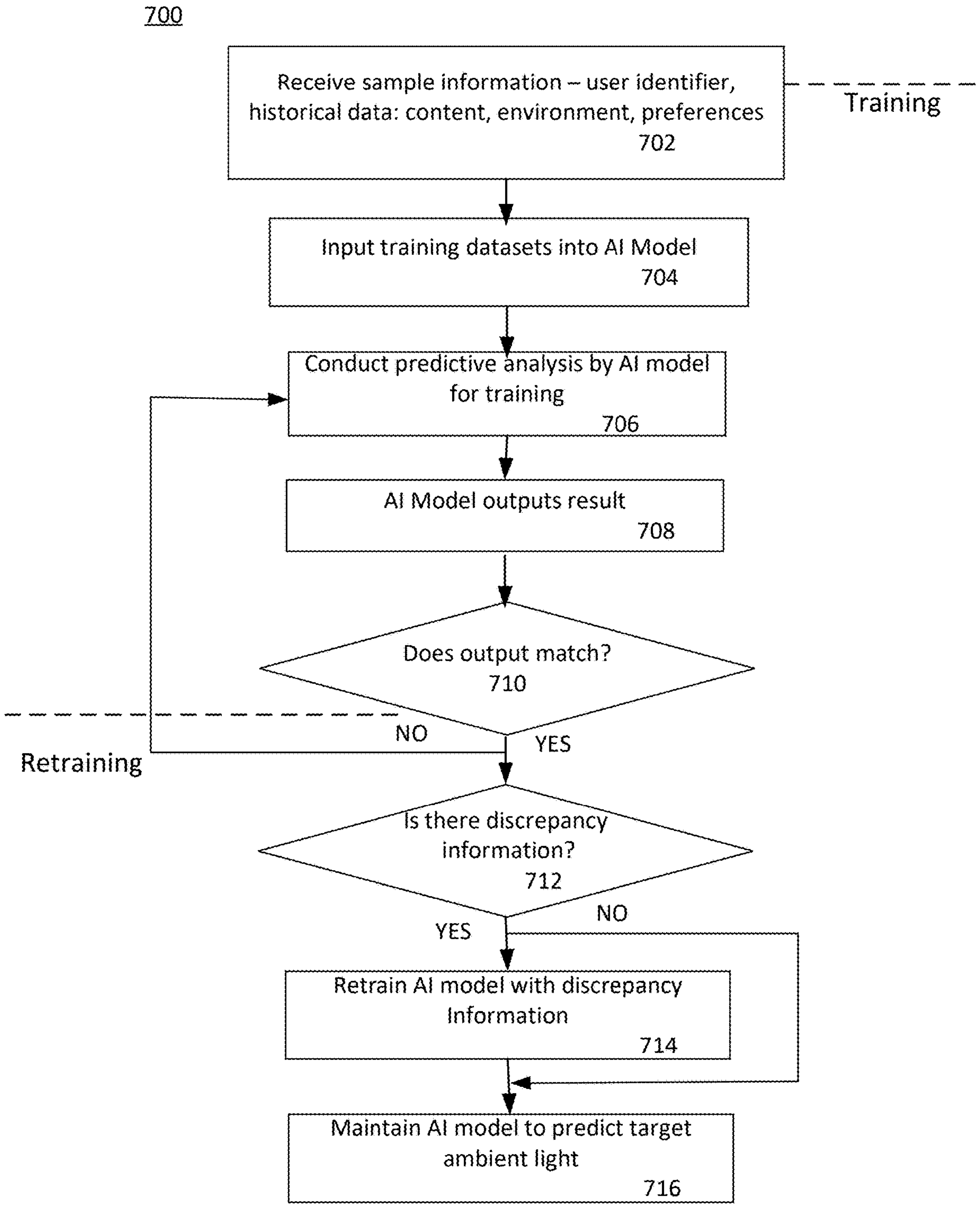
FIG. 7 is a flow diagram of an example method of training an AI model to predict a target ambient light, in accordance with some implementations.

FIG. 7 shows a flowchart of an example training process to train the AI model to predict likely target ambient light for the peripheral area proximal to one or more edges of the display screen. In some implementations, the techniques to train the AI model may employ supervised classification algorithms, such as logistic regression algorithms. In some implementations, unsupervised or semi-supervised techniques may be employed.

In block 702, sample information including historical data associated with likely target ambient light are received or otherwise accessed for assessment/training purposes. In some implementations, the sample information may include a user identifier to associate target ambient light with particular users. In still some implementations, the sample information may not be specific for a user and no user identifier information is needed. In such cases, the sample information may be associated with a group of user types, or for general viewing of content that is not specific to a population.

In block 704, various historical data are analyzed to determine training datasets by extracting sample information relevant to viewing instances. Some sample information, such as outdated sample information or unreliable sample information, may be found to be irrelevant and discarded.

In block 706, training datasets are inputted into the AI model. Such training datasets may include ambient light characteristics that are associated with ambient light factors such as various content types and environmental setting, such as indoors or outdoors. Some training may be performed on training datasets that are specific to a user or a user type (e.g., category of user grouped by user characteristics, such as age, gender, demographics, occupation, or location of the display screen such as a type of public establishment). User specific factors may include historical user viewing behavior may be used for training. Such user specific training data may include a typical time of day the user views a particular type of content, idiosyncrasies of the user, such as visual impairments of light sensitivities, content genre usually viewed by the user, etc.

In block 708, the AI model conducts predictive analysis using the training datasets. The training of the AI model may include determining patterns in ambient lighting that improves quality of particular content. Based on the analysis, the AI model outputs a result of the analysis in block 710. The output result includes likely target ambient light characteristics that is predicted to result in high quality content viewing.

In decision block 712, the output result is compared with the training dataset inputted into the AI model and predetermined expected output result, to determine whether the output result matches. It is determined whether a threshold of success is achieved by the output result. The threshold of success may specify that some value equal to or less than 100% accuracy (such as 80%-90% success rate) is acceptable output results to be used.

If it is decided in decision block 712 that the output results match the training datasets to meet the threshold of success, the process continues to decision block 714 described below. If there is a finding that the output results fail to match according to the threshold of success, the AI model is retrained by returning to block 708 and conducting predictive analysis again until the output result matches the training dataset. If a match is not achieved after a threshold number of tries, the analysis algorithm and/or training dataset may be assessed to find a solution to the failures.

In decision block 714, it may be determined whether there is discrepancy information from prior AI model output results, in which the output of particular prompts was found to fail a threshold level of success in predicting a target ambient light that provides quality content viewer as perceived by a user. Discrepancy information may include feedback from an external support resource, quality control studies, user survey data, failure reports, etc. The discrepancy information may be used for retraining in block 716. After discrepancy information retraining is complete, the process proceeds to block 718 described below.

If no discrepancy information is received, the process skips the discrepancy information retraining and continues to block 718 to maintain the AI model for future use in predicting target ambient light. For example, the AI model may be trained at a computer processing system independent from the light control system. The light control system may receive the AI model when needed to be applied to the light control process.

The processes of FIGS. 5, 6, and 7 described herein or variations and/or combinations of those processes, can be performed via software, hardware, and combinations thereof may be performed under the control of one or more computer systems configured with executable instructions and/or other data, and may be implemented as executable instructions executing collectively on one or more processors. Although the description has been described with respect to particular implementations thereof, these particular implementations are merely illustrative, and not restrictive. Additional steps may be added, steps may be removed, and/or the order of steps may be varied.

Computer programs are employed and when executed by one or more processors, are operable to perform various tasks of methods including the communication processes, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory, storage device or memory on processor. A machine readable medium is any computer program product, apparatus or device used to provide machine instructions or data to a programmable processor.

Any suitable programming language can be used to implement the routines of particular embodiments including IOS, Objective C, Swift, Java, Cotlin, C, C++, C #, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method to control light proximally to a display screen to display content, the method comprising:
- receiving a request to display the content on the display screen;
- identifying a target ambient light for a peripheral area proximal to at least one edge of the display screen;
- receiving at least one reflective parameter of a rear surface behind the display screen;
- detecting a distance from at least one of the plurality of illuminators to the rear surface;
- directing a plurality of illuminators spaced on the display screen, to emit a defined brightness level and color of light angled toward the rear surface, such that reflection of the light illuminates the peripheral area at the target ambient light, wherein the defined brightness level and color of light is based, at least in part, on the at least one reflective parameter of the rear surface, and wherein the defined brightness level and color of light includes a correction for a distance that fails to meet an acceptable distance range; and
- adjusting display screen settings to display the content to correspond with the target ambient light.

2. The computer-implemented method of claim 1, wherein the at least one reflective parameter of the rear surface include at least one of: a color, a texture, a paint finish, or a material.

3. The computer-implemented method of claim 2, wherein the at least one reflective parameter includes a color of the rear surface that reflects light at an irregular value that fails to meet a predefined standard reflectance level, and the method further comprises:
- adjusting a color temperature of the light to correct for the irregular value of reflectance.

4. The computer-implemented method of claim 1, wherein the at least one reflective parameter is received from one or more sources including: user input at a user interface, stored prior user input, a stored standard reflective parameter, or one or more sensors directed toward the rear surface.

5. The computer-implemented method of claim 1, wherein target ambient light is based, at least in part, on one or more ambient light factors chosen from the group of: a type of the content, a standard viewing light, a user preference, a historical user viewing behavior, and combinations thereof.

6. The computer-implemented method of claim 5, wherein identifying the target ambient light includes:
- inputting historical user viewing data into an artificial intelligence (AI) model trained on typical ambient light corresponding to historical data; and
- receiving an output result from the AI model indicating a predicted ambient light that corresponds with a user viewing pattern.

7. The computer-implemented method of claim 5, wherein the historical user viewing pattern includes at least one of: a genre of movie, a particular movie, a viewing time of day, and user lighting conditions.

8. The computer-implemented method of claim 1, further comprising:
- controlling a remote illuminator to emit a defined quantity of light toward the at least one edge of the display screen.

9. An ambient light control system for controlling light to display content, the system comprising:
- a display comprising:
- a display screen;
- a plurality of spaced illuminators; and
- logic encoded in one or more non-transitory media for execution by the one or more processors and when executed operable to perform operations comprising:
- receiving a request to display the content on the display screen;
- identifying a target ambient light for a peripheral area proximal to at least one edge of the display screen;
- receiving at least one reflective parameter of a rear surface behind the display screen;
- detecting a distance from at least one of the plurality of illuminators to the rear surface;
- directing a plurality of illuminators spaced on the display screen, to emit defined brightness level and color of light angled toward the rear surface, such that reflection of the light illuminates the peripheral area at the target ambient light, wherein the defined brightness level and color of light is based, at least in part, on the at least one reflective parameter of the rear surface, and wherein the defined brightness level and color includes a correction for a distance that fails to meet an acceptable distance range; and adjusting display screen settings to display the content to correspond with the target ambient light.

10. The ambient light control system of claim 9, wherein the at least one reflective parameter of the rear surface include at least one of: a color, a texture, a paint finish, or a material.

11. The ambient light control system of claim 9, wherein target ambient light is based, at least in part, on one or more ambient light factors chosen from the group of: a type of the content, a standard viewing light, a user preference, a historical user viewing behavior, and combinations thereof.

12. The ambient light control system of claim 11, wherein identifying the target ambient light includes:

inputting historical user viewing data into an artificial intelligence (AI) model trained on typical ambient light corresponding to historical data; and receiving an output result from the AI model indicating a predicted ambient light that corresponds with a user viewing pattern.

13. The ambient light control system of claim 11, wherein the historical user viewing pattern includes at least one of: a genre of movie, a particular movie, a viewing time of day, and user lighting conditions.

14. A non-transitory computer-readable storage medium carrying program instructions thereon for controlling light proximally to a display screen to display content, the instructions when executed by one or more processors cause the one or more processors to perform operations comprising:

receiving a request to display the content on the display screen;

identifying a target ambient light for a peripheral area proximal to at least one edge of the display screen;

receiving at least one reflective parameter of a rear surface behind the display screen;

detecting a distance from at least one of the plurality of illuminators to the rear surface;

directing a plurality of illuminators spaced on the display screen, to emit defined brightness level and color of light angled toward the rear surface, such that reflection of the light illuminates the peripheral area at the target ambient light, wherein the defined brightness level and color of light is based, at least in part, on the at least one reflective parameter of the rear surface, and wherein the defined brightness level and color includes a correction for a distance that fails to meet an acceptable distance range; and adjusting display screen settings to display the content to correspond with the target ambient light.

15. The non-transitory computer-readable storage medium of claim 14, wherein the at least one reflective parameter of the rear surface include at least one of: a color, a texture, a paint finish, or a material.

16. The non-transitory computer-readable storage medium of claim 14, wherein target ambient light is based, at least in part, on one or more ambient light factors chosen from the group of: a type of the content, a standard viewing light, a user preference, a historical user viewing behavior, and combinations thereof.

17. The non-transitory computer-readable storage medium of claim 16, wherein the historical user viewing pattern includes at least one of: a genre of movie, a particular movie, a viewing time of day, and user lighting conditions.

* * * * *